No. 679,693. Patented July 30, 1901.
W. BURKHART.
COMBINED DRILL AND COUNTERSINK.
(Application filed Apr. 13, 1901.)
(No Model.)
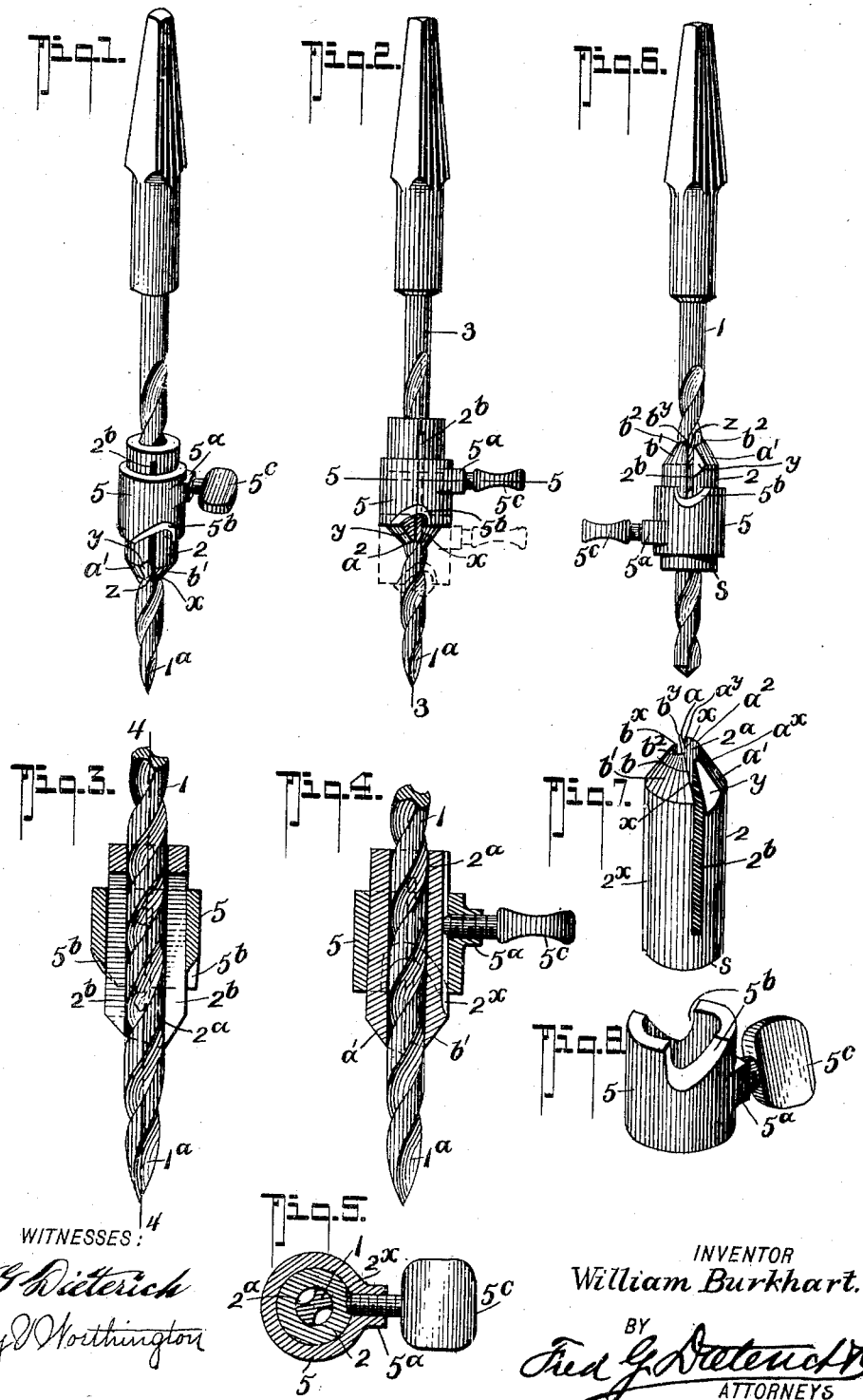

UNITED STATES PATENT OFFICE.

WILLIAM BURKHART, OF WILLIAMSPORT, PENNSYLVANIA, ASSIGNOR OF ONE-HALF TO GEORGE B. UPDEGRAFF, OF SAME PLACE.

COMBINED DRILL AND COUNTERSINK.

SPECIFICATION forming part of Letters Patent No. 679,693, dated July 30, 1901.

Application filed April 13, 1901. Serial No. 55,705. (No model.)

*To all whom it may concern:*

Be it known that I, WILLIAM BURKHART, residing at Williamsport, in the county of Lycoming and State of Pennsylvania, have invented a new and Improved Combined Drill and Countersink, of which the following is a specification.

My invention seeks to provide a simple, inexpensive, and readily-manipulated attachment adapted to be coöperatively combined with an ordinary gimlet or screw-point drill or bit, having for its purpose to chamfer the edge of the screw-hole bored by the bit to form the countersink to accommodate the bevel of the particularly-sized screw for which the bore is especially made.

My invention in its generic nature comprehends a chamfering device capable of being adjustably mounted on the bit-stock and capable of being quickly set on the screw or gimlet end of the bit and have its cutting edge adjusted to cut a countersink to suit the size of screw to be used and in which when the countersink device is once set for a particularly-sized screw the drill will operate to only produce the bore with its countersink for that particular-size screw for which it may be set.

My invention also comprehends in its make-up a countersink or chamfering sleeve slidably mounted upon the drill, having a cutting edge capable of being circumferentially adjusted, whereby to cut bevels of different diameters to suit the size of screw to be used, and a simple means for clamping said sleeve onto the drill.

Again, my invention includes in its make-up a sleeve slidably and reversibly mounted on the drill, having at one end a circumferentially-adjustable cutting edge, and its other end non-adjustable and terminating in a flat surface to produce a stop when set to a reversed position to regulate the depth of bore of the bit, and means for conveniently clamping the said reversibly and slidably mounted sleeve onto the bit when set to its different adjustments thereon.

In its more subordinate features my invention consists in certain novel features of construction and peculiar combination of parts, all of which will hereinafter be fully described, and particularly pointed out in the appended claims, reference being had to the accompanying drawings, in which—

Figure 1 is a perspective view illustrating my improvements as applied to a gimlet-point drill. Fig. 2 is a side elevation of the same, the countersink device being shown in full lines in a position for making the countersink for a large-sized screw and in dotted lines for making the countersink for a smaller-sized screw. Fig. 3 is a vertical section taken on the line 3 3 of Fig. 2. Fig. 4 is a similar view taken on the line 4 4 of Fig. 3. Fig. 5 is a horizontal section on the line 5 5 of Fig. 2. Fig. 6 is a side elevation showing the countersink-forming member adjusted as a stop on an ordinary straight-bit stock. Figs. 7 and 8 are detail views of the sleeve and the clamping-band therefor.

In the accompanying drawings, 1 designates the bit-stock, which, as shown in Figs. 1 to 4, has a tapering or gimlet end $1^a$, and the said stock is of the ordinary construction.

2 designates the countersink device, the construction of which forms the essential feature of my invention. This device is in the nature of a hollow cylinder having a smooth bore $2^a$ to slide freely on the twist drill or stock 1. The cylinder 2 has one or more longitudinally-extending slits $2^b$ extending nearly its full length from the bottom or outer edge upward. In the preferred form the cylinder has two slits $2^b$ at diametrically opposite sides to provide, as it were, opposite cutter-heads $a$ and $b$, the special construction of which is best illustrated in Fig. 7, by reference to which it will be seen the lower ends of said cutters bevel or taper inward, as at $a'$ $b'$, to form cutting members. The cutting edges $x$ of the members $a'$ $b'$ are in line with the coincident straight edges of the slits $2^a$, and the edges $y$ of said member are beveled inwardly and upwardly to provide the throat or openings $z$ $z$ for the shaving as it is cut from the wood or metal surface in which the countersink is cut, and to facilitate the cutting operation the lower edges $a^2$ and $b^2$ of the members $a'$ $b'$ extend in a spiral direction, so that the ends $a^x$ $b^x$ of said edges $a^2$ and $b^2$ stop in a plane above the front or cutting points $a^y$ $b^y$, as clearly shown in Figs. 6 and 7.

5 designates a sleeve slidable on the cylinder 2, and said sleeve has a threaded hub $5^a$ to receive a clamp-screw $5^c$, which engages the cylinder 2, and to provide for a free escape of the cuttings the lower edge of the sleeve 5 has cut-out portions $5^b$, which register with the slits $2^a$ in the member 2, and to hold the sleeve with its portions $5^b$ in proper register with the slits $2^a$ the member 2 is formed with an external vertical groove $2^x$, with which the clamp-screw engages, as shown.

So far as described it will be seen that by moving the cylinder 2 up to the position shown in full lines in Fig. 2 the cutting members $a$ and $b$ will be expanded to the largest diameter of the drill and be in position to cut the countersink for a large-size screw, and in case it is desired to bore for a smaller-size screw the cylinder is moved down on the stock 1 sufficient to leave the length of the gimlet end of the drill exposed equal that of the screw to be used, and by reason of the taper of the stock and the yielding condition of the two cutter-heads $a$ and $b$ said heads are contracted radially by the clamp-screw, so the penetrating ends of the heads $a$ and $b$ snugly grip around the tapered end of the stock 1. By my improvement the cylinder 2 can be set to act both as a stop and a countersink, and thereby permit of boring the desired depth and size of hole and making a proper countersink all in one operation, it being understood the cylinder 2 may readily be set for any-size screw-head.

For boring holes having a like diameter throughout by a straightway bit, as shown in Fig. 2, the cylinder is reversed, so its square end $s$ is down, and by setting said cylinder to the predetermined position any number of drillings can be made of like depth without any special care by the operator, the cylinder 2 in this instance acting as a gage-stop.

Having thus described my invention, what I claim, and desire to secure by Letters Patent, is—

1. The combination with the cylinder, the lower ends of which terminate in countersink cutting edges, said cylinder having radial slits, extending from the lower edge upward and having a vertical external groove, the sleeve slidable upon the cylinder, a clamp-screw carried by the cylinder, and adapted to engage with the external groove of said cylinder, said sleeve having cut-out portions on its lower edge, registering with the slits in the said cylinder, all being arranged substantially as shown and for the purposes described.

2. The combination with the drill, and the cylinder 2, detachably and compressibly fitted on the drill, said cylinder having countersink cutting edges at the lower end, of a clamping-collar vertically adjustable on the cylinder, said collar having upwardly-extending recesses $5^b$, and means for clamping the collar on the cylinder, substantially as shown and for the purposes described.

WILLIAM BURKHART.

Witnesses:
E. W. BATZLE,
S. K. MCBRIDE.